Feb. 28, 1933.  H. D. SEGAR  1,899,591

LAMINATED MATERIAL

Filed Sept. 8, 1930

Inventor:
Harry D. Segar.
by Charles E. Tuller
His Attorney.

Patented Feb. 28, 1933

1,899,591

UNITED STATES PATENT OFFICE

HARRY D. SEGAR, OF PITTSFIELD, MASSACHUSETTS, ASSIGNOR TO GENERAL ELECTRIC COMPANY, A CORPORATION OF NEW YORK

LAMINATED MATERIAL

Application filed September 8, 1930. Serial No. 480,299.

The present invention relates to the manufacture of laminated materials and in particular to composite structures built up from fibrous materials, such as paper, which structures are used for insulating purposes in oil-filled electrical devices.

The object of my invention is to provide an improved construction of laminated materials for use as outlined, and for a consideration of what I believe to be novel and my invention, attention is directed to the following specification and the claims appended thereto.

In the manufacture of composite materials employed as insulation in oil-filled electrical devices, resinous materials such as shellac and phenolic resins have been employed which have served to impregnate the fibrous material, such as paper, and to bond the successive layers thereof to form a strong, hard, product of good insulating qualities. In oil-filled electrical devices, such as oil-filled transformers, oil-filled switches, oil-filled cables, etc., insulation of requisite mechanical and dielectric strength is essential. In addition, where composite or laminated insulating material is employed, for example, as high voltage bushing core insulation used to insulate the high voltage conductors coming from oil-filled transformers or oil-filled switches, or as insulation cores employed in oil-filled cable stop joints, there has been the added problem of obtaining an insulating material of the character described which is oil-tight parallel to the laminations, and oil-tight between the surface of the conductor, for example, and the insulating material directly coming in contact therewith. For the production of such composite material the bonding or cementing agent must not only have the necessary features outlined but must in addition be relatively cheap, economical and easy to manufacture and easily applied. Materials heretofore employed in the composite materials used for this purpose, such as phenolic resins, have been satisfactory so far as the insulating qualities are concerned, but have not rendered the laminated insulation oil-tight parallel to the laminations.

I have found that, if composite insulation material is so formed, that the fibrous material employed is bonded or cemented together with a binder comprising a shellac-alkyd resin composition wherein the resin is modified so that it contains a relatively large proportion of unsaturated monobasic aliphatic acid in combination therewith, the resulting product may be built up into laminated material, formed into various shapes for use in oil-filled electrical devices, possesses the requisite dielectric strength, and is oil-tight parallel to the laminations thereof.

Referring to the accompanying drawing forming part of this application,

In carrying my invention into practice I may proceed as follows:

I first prepare an alkyd resin modified as stated above. As is well known, alkyd resins include all those complexes resulting primarily from the inter-reaction of a polyhydric alcohol and polybasic acid. The most common example of an alkyd resin is that produced by the inter-reaction of glycerin and phthalic anhydride. I may employ any polyhydric alcohol and any polybasic acid. With these I employ an unsaturated monobasic aliphatic acid, as such, or the glyceride containing such acids. For example, I may employ as the unsaturated monobasic aliphatic acid, the fatty acids derived from linseed oil, or linseed oil itself; or I may use the fatty acids derived from chinawood oil, or the oil itself; and it is within the scope of my invention to use oleic acid or any other suitable unsaturated monobasic aliphatic acid. It is understood that the polyhydric alcohol, polybasic acid and unsaturated monobasic aliphatic acid may be reacted with or without other suitable ingredients.

As a specific example of a resin which I prefer to use I cite the following, but it is to be understood, however, that the resin described is merely by way of illustration:

| | |
|---|---|
| Phthalic anhydride | 125 pounds |
| Glycerin | 68 pounds |
| Linseed oil fatty acids | 110 pounds |
| Rosin | 35 pounds |
| Castor oil | 18 pounds |

The above ingredients are reacted together by heating rapidly with stirring up to about 250° C. the resin then being cooked two hours at from 240° to 250° C. When the resin has been prepared it is transferred while still hot and liquid to a steam jacketed kettle which can be agitated. An equal weight of shellac is added while stirring and with the application of heat if necessary to keep the mass molten. As soon as the shellac is all stirred in, the material is discharged into suitable containers where it is allowed to cool and harden, after which the composition is ready for use in accordance with my invention.

Figure 1:
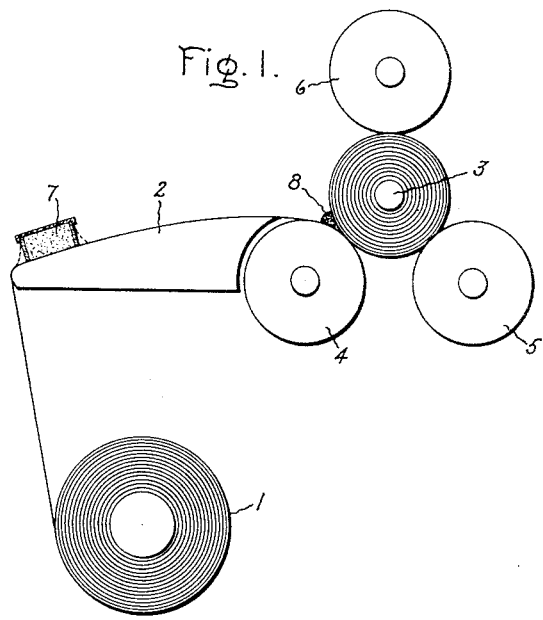
Fig. 1 illustrates diagrammatically an apparatus for carrying out the impregnating and bonding process and for winding up the treated material, to form a tube, or to insulate a conductor.

Referring to Fig. 1 of the drawing the material to be impregnated and bonded together, for example Kraft paper, is rolled from a roll 1, over a heated plate 2 and is wound up on an element 3. This element 3 may be a mandrel when it is desired to form a tube, or the conductor itself when the latter is to be insulated by the composite material. This element 3 is rotated by any suitable driving mechanism (not shown) which may also be used to rotate pressure rolls 4, 5 and 6 which bear against the roll being wound. Rolls 4 and 5 preferably are heated, but roll 6 need not be, and is preferably, not heated.

The resinous composition used as the impregnating and bonding agent is supplied to the paper as it passes onto the hot plate 2. This may be conveniently done by the operator by inverting and pressing a container 7 carrying the composition, against the paper on the hot plate and spreading it thereon. The composition forms in the molten state a small pool at 8 where the first pressure roll 4 presses against the paper being wound. Suitable means, such as an air jet (not shown) may be used at opposite ends of the pool to confine it within the limits of the paper. The liquefied composition uniformly fills and coats the paper at this pool.

Figure 2:
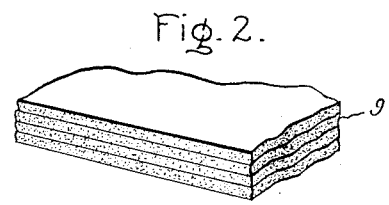
Fig. 2 shows in magnified form a fragment of laminated material made in accordance with my invention.

Fig. 2 shows diagrammatically and greatly magnified, a fragment of the finished insulation 9.

Figure 3:
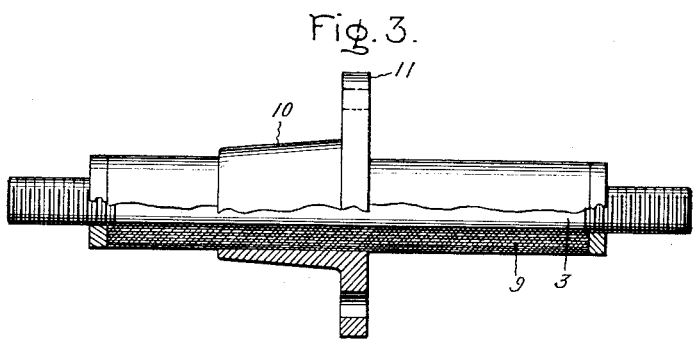
Fig. 3 illustrates by way of example a high voltage bushing core insulating the conductor on which it is formed by the process illustrated in Fig. 1.

When the element 3 has received the proper thickness of insulation, the coating operation may be stopped and the element 3 carrying the insulation removed from the apparatus. If the element 3 is a mandrel employed temporarily for the purpose of winding the insulation thereon, the mandrel may be removed from the insulation leaving it in the form of a tube. If, however, the insulation is to be employed as a core, the element 3 on which it has been formed is a metallic conductor and it is left thereon. Referring to Fig. 3, there is shown by way of illustration the insulation 9 as applied to such a conductor, the insulation having been machined to proper size and provided with a flanged collar 10 thereon to permit of its application to the oil-filled device in which it is to be used. The form diagrammatically shown in this figure is applicable to such oil-filled devices as oil-filled transformers, the conductor 3 being a high voltage conductor coming from the device.

It is obvious that, by regarding the flange 11 on the collar 10 in Fig. 3 as the partition member and enclosing the same in a suitable casing such an arrangement would be useful as a stop joint in a fluid filled cable, such as an oil-filled cable.

What I claim as new and desire to secure by Letters Patent of the United States, is:

1. A laminated structure comprising sheets of fibrous material cemented together with a composition comprising shellac and an alkyd resin containing a relatively large proportion of unsaturated monobasic aliphatic acid chemically combined therein, said structure being oil-tight parallel to the laminations thereof.

2. A laminated product adapted for use in oil-filled electrical apparatus, said product being oil-tight parallel to the laminations thereof and comprising superposed sheets of paper united in stratified relation with a binder comprising shellac and the condensation product of glycerin, phthalic anhydride, linseed oil fatty acids, rosin and castor oil.

3. Core insulation comprising a conductor and laminated insulation surrounding said conductor, said insulation comprising sheets of fibrous material cemented together with a composition comprising shellac and an alkyd resin containing a relatively large proportion of unsaturated monobasic aliphatic acid chemically combined therein.

4. A laminated structure comprising sheets of fibrous material cemented together with a composition comprising shellac and an alkyd resin containing a relatively large proportion of fatty acids derived from drying oil chemically combined therein, said structure being oil-tight parallel to the laminations thereof.

5. Core insulation comprising a conductor and laminated insulation surrounding said conductor, said insulation comprising sheets of fibrous material cemented together with a composition comprising shellac and an alkyd resin containing a relatively large proportion of fatty acids derived from drying oil chemically combined therein.

6. Core insulation comprising a conductor and laminated insulation surrounding said conductor, said insulation comprising sheets of paper united in stratified relation with a binder comprising shellac and the condensation product of glycerine, phthalic anhydride, linseed oil fatty acids, rosin and castor oil.

7. A laminated product adapted for use in oil-filled electrical apparatus, said product being oil-tight parallel to the laminations thereof and comprising superposed sheets of paper united in stratified relation with a binder comprising shellac and the condensation product of glycerin, phthalic anhydride, unsaturated monobasic aliphatic acid, rosin and castor oil.

8. A laminated product adapted for use in oil-filled electrical apparatus, said product being oil-tight parallel to the laminations thereof and comprising superposed sheets of paper united in stratified relation with a binder comprising shellac and the condensation product of glycerin, phthalic anhydride, unsaturated monobasic aliphatic acid, rosin and a non-drying oil glyceride.

In witness whereof, I have hereunto set my hand this 5th day of Sept. 1930.

HARRY D. SEGAR.